(12) United States Patent  
Moczydlowski

(10) Patent No.: US 9,043,325 B1  
(45) Date of Patent: May 26, 2015

(54) COLLECTING USEFUL USER FEEDBACK ABOUT GEOGRAPHICAL ENTITIES

(75) Inventor: Wojciech Moczydlowski, Forest Hills, NY (US)

(73) Assignee: Google Inc., Mountain View, CA (US)

( * ) Notice: Subject to any disclaimer, the term of this patent is extended or adjusted under 35 U.S.C. 154(b) by 185 days.

(21) Appl. No.: 13/168,854

(22) Filed: Jun. 24, 2011

(51) Int. Cl.  
  *G06F 17/30* (2006.01)

(52) U.S. Cl.  
  CPC ...... *G06F 17/30061* (2013.01); *G06F 17/3053* (2013.01); *G06F 17/30861* (2013.01)

(58) Field of Classification Search  
  CPC .......... G06F 17/2785; G06F 17/30864; G06F 17/30241; G06F 17/30386  
  USPC ........... 707/736, 737, 758, 802, 803; 715/765  
  See application file for complete search history.

(56) References Cited

U.S. PATENT DOCUMENTS

| | | | | |
|---|---|---|---|---|
| 7,373,246 | B2 * | 5/2008 | O'Clair ........................ | 701/532 |
| 7,698,059 | B2 * | 4/2010 | O'Clair ........................ | 701/469 |
| 7,933,897 | B2 * | 4/2011 | Jones et al. .................. | 707/723 |
| 8,108,787 | B2 * | 1/2012 | Finger et al. ................. | 715/766 |
| 8,200,676 | B2 * | 6/2012 | Frank .......................... | 707/749 |
| 8,412,709 | B1 * | 4/2013 | Belwadi et al. .............. | 707/736 |
| 8,484,199 | B1 * | 7/2013 | Katragadda et al. .......... | 707/723 |
| 8,527,307 | B2 * | 9/2013 | Hamilton et al. ............ | 705/7.11 |
| 2006/0238379 | A1 * | 10/2006 | Kimchi et al. ............. | 340/995.1 |
| 2006/0238381 | A1 * | 10/2006 | Kimchi et al. ............. | 340/995.1 |
| 2006/0238382 | A1 * | 10/2006 | Kimchi et al. ............. | 340/995.1 |
| 2006/0241860 | A1 * | 10/2006 | Kimchi et al. ............... | 701/208 |
| 2006/0271280 | A1 * | 11/2006 | O'Clair ........................ | 701/208 |
| 2007/0011150 | A1 * | 1/2007 | Frank .............................. | 707/4 |
| 2007/0143345 | A1 * | 6/2007 | Jones et al. ................. | 707/104.1 |
| 2007/0210937 | A1 * | 9/2007 | Smith et al. ............... | 340/995.1 |
| 2007/0218900 | A1 * | 9/2007 | Abhyanker ................ | 455/435.1 |
| 2007/0273558 | A1 * | 11/2007 | Smith et al. ............... | 340/995.1 |
| 2008/0010262 | A1 * | 1/2008 | Frank ................................ | 707/3 |
| 2008/0010273 | A1 * | 1/2008 | Frank ................................ | 707/5 |
| 2008/0010605 | A1 * | 1/2008 | Frank ............................ | 715/765 |
| 2008/0133488 | A1 * | 6/2008 | Bandaru et al. .................... | 707/3 |
| 2009/0100007 | A1 * | 4/2009 | Campbell et al. ................. | 707/2 |
| 2009/0106681 | A1 * | 4/2009 | Gupta et al. .................. | 715/771 |
| 2009/0112683 | A1 * | 4/2009 | Hamilton et al. ............... | 705/10 |
| 2009/0187537 | A1 * | 7/2009 | Yachin et al. ..................... | 707/3 |
| 2009/0281724 | A1 * | 11/2009 | Blumenberg et al. ......... | 701/208 |
| 2010/0118025 | A1 * | 5/2010 | Smith et al. .................. | 345/418 |
| 2010/0325107 | A1 * | 12/2010 | Kenton et al. ................. | 707/723 |
| 2011/0131500 | A1 * | 6/2011 | Ohazama ..................... | 715/738 |
| 2012/0124039 | A1 * | 5/2012 | Sandholm et al. ............ | 707/724 |
| 2012/0253212 | A1 * | 10/2012 | Maeno .......................... | 600/508 |
| 2012/0254212 | A1 * | 10/2012 | Shaw et al. ................... | 707/758 |
| 2012/0254226 | A1 * | 10/2012 | Shaw et al. ................... | 707/769 |

* cited by examiner

*Primary Examiner* — Jean M Corrielus  
(74) *Attorney, Agent, or Firm* — Dority & Manning, P.A.

(57) ABSTRACT

A system and machine-implemented method for displaying user-submitted comments for geographic entities, including displaying a list of geographic entities, and displaying concurrently for each listed geographic entity one or more user-submitted comments associated with the geographic entity and a comment entry field which permits a user to submit a new comment associated with the geographic entity.

17 Claims, 4 Drawing Sheets

COLLECTING USEFUL USER FEEDBACK ABOUT GEOGRAPHICAL ENTITIES

BACKGROUND

Online map services have been available for many years, offering functionality including displaying graphical maps (whether image-, line-, or vector-based maps), locating locations by address, and providing travel directions (often illustrated on the above graphical maps). Some map services also maintain a database of geographical entities (such as restaurants, stores, and tourist destinations), their respective locations, and other information regarding these points of interest. Searches may be run against this database to identify particular points of interest for a user. For example, a user of a map service may submit a text-based search query for "thai restaurant, el cerrito, ca", resulting in a list of restaurants serving Thai food in or about El Cerrito, Calif., which may also be listed and shown on a graphical map display.

Additionally, some online map services have included a mechanism for user-submitted reviews of geographical entities. Information provided in such reviews, whether in the form of a "star" rating or textual data, is useful for search and ranking of geographical entities. However, few users take time to submit ratings or comments about geographical entities, which limits the benefits obtained from user-submitted information, such as enhanced search quality or simply providing more information for consumption by users.

SUMMARY

The disclosed subject matter relates to a machine-implemented method for displaying user-submitted comments for a plurality of geographic entities. According to the method, a list of geographic entities is displayed, and a plurality of user-submitted comments associated with the geographic entity and a comment entry field which permits a user to submit a new comment associated with the geographic entity are displayed concurrently for each listed geographic entity.

The disclosed subject matter further relates to a system for displaying user-submitted comments for a plurality of geographic entities, the system including one or more processors, and a computer readable storage medium comprising instructions stored therein, which when executed by the processors, cause the processors to perform operations including displaying a list of geographic entities, displaying, concurrently for each listed geographic entity, a plurality of user-submitted comments associated with the geographic entity and a comment entry field which permits a user to submit a new comment associated with the geographic entity, receiving a second new comment, and updating, while displaying the user-submitted comments, the displayed user-submitted comments to include the second new comment.

The disclosed subject matter also relates to a computer readable storage medium comprising instructions stored therein, which when executed by a machine, cause the machine to perform operations including displaying a list of geographic entities, displaying, concurrently for each listed geographic entity, a plurality of user-submitted comments associated with the geographic entity and a comment entry field which permits a user to submit a new comment associated with the geographic entity, receiving the new comment associated with one of the plurality of geographic entities, and utilizing the new comment for ranking geographical entities.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several aspects of the disclosed subject matter are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Figure 1:
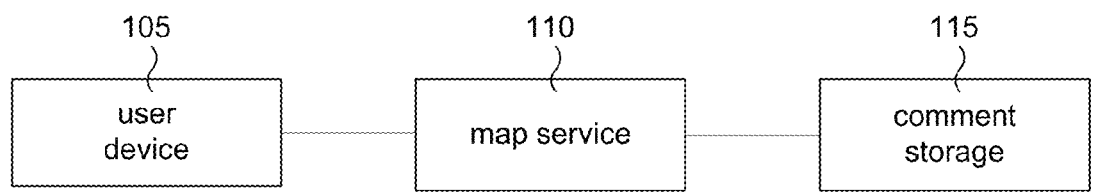
FIG. 1 illustrates an exemplary architecture diagram for the disclosed techniques for displaying user-submitted comments.

FIG. 1 illustrates an exemplary architecture diagram for the disclosed techniques for displaying user-submitted comments. User device 105 accesses online map service 110 via a network connection, such as, but not limited to, the Internet or a mobile data network. User 105 may be a computing device, such as, but not limited to, a desktop computer, laptop or tablet computer, or a programmable telephone device. User device 105 may provide an interface for displaying information provided by map service 110 via a program such as, but not limited to, a web browser or dedicated map software program.

Online map service 110 displays graphical maps (whether image-, line-, or vector-based maps) via user device, can locate locations by address, and can provide travel directions (often illustrated on the above graphical maps). Additionally, online map service maintains a database of geographical entities (such as restaurants, stores, and tourist destinations), their respective locations, and other information regarding these geographical entities. Via user device 105, a user may perform searches against this database to identify particular points of interest, with the results of the search being listed and shown on a graphical map display on user device 105. An example of such a search is a text-based search query, such as the search text entry element 205 illustrated in FIG. 2. However, a search is not limited to text-based queries. For example, a graphical map display on user device 105 may be used to identify a region in which to search for geographical entities with attributes specified via a menu system. As another example, user device 105 may be used to select a particular geographical entity and request that map service 110 search for other nearby geographical entities which are similar to a selected geographical entity (for example, if a Mexican restaurant is selected, other nearby Mexican restaurants are identified).

Comment storage 115 obtains and stores user-submitted comments associated with individual geographic entities. In some aspects, comment storage 115 may be integrated with the above-mentioned database of geographical entities. In some aspects of the disclosed subject matter, user device 105 may be able to interact directly with comment storage 115 to store and retrieve user-submitted comments.

Figure 2:
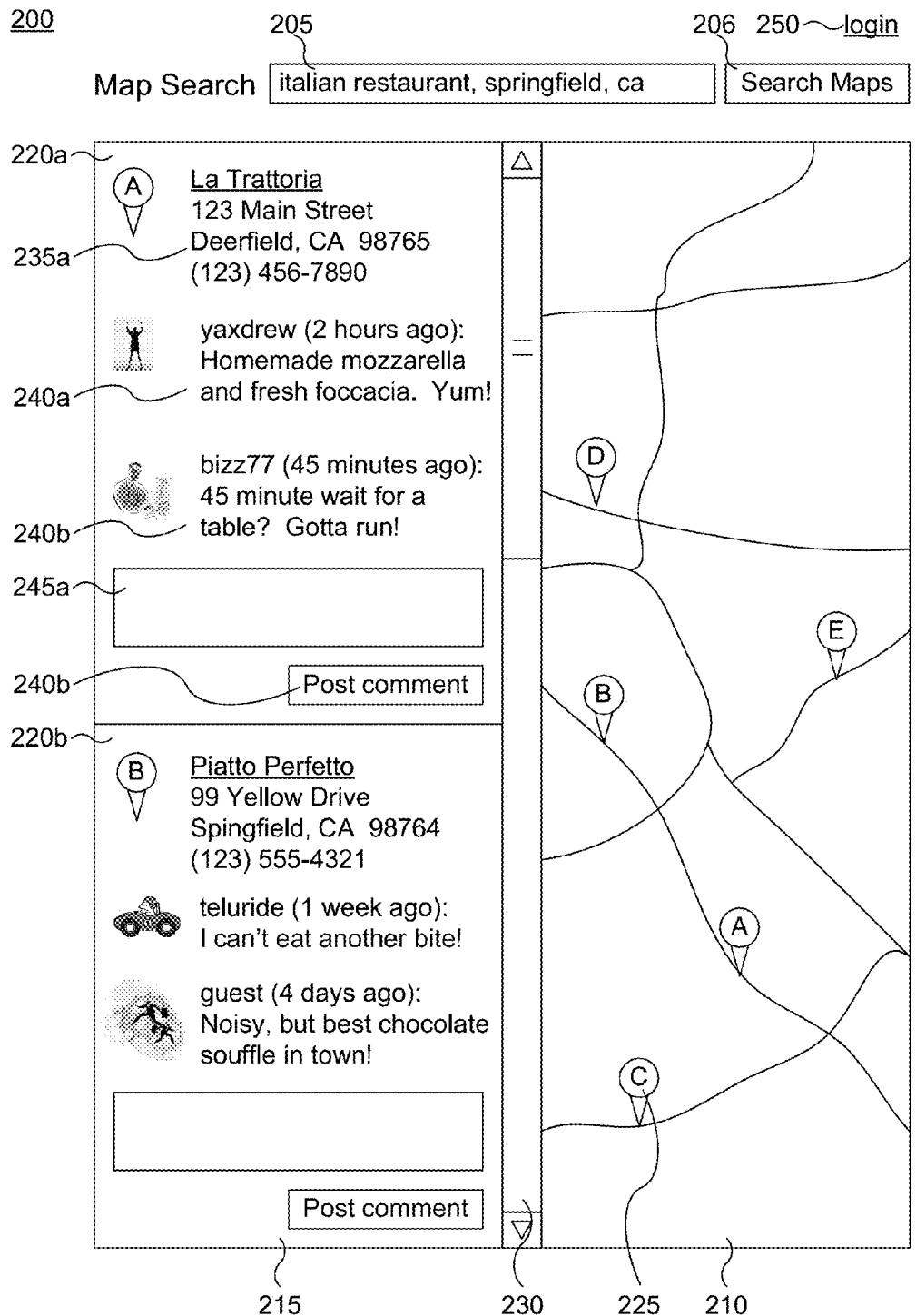
FIG. 2 illustrates a display 200 provided via user device 105 for displaying and submitting user-submitted comments.

FIG. 2 illustrates a display 200 provided via user device 105 for displaying and submitting user-submitted comments. For example, display 200 may be provided via a web browser program executing on user device 105. Display 200 includes search text entry element 205, into which a user may submit a text-based query to map service 110 (in this example, a search for restaurants serving Italian food in the vicinity of Springfield, Calif.). By clicking on search button 206, the search query specified in search text entry element 205 is submitted to map service 110. Map service 110 performs a search against its database of geographical entities to identify and rank a plurality of geographical entities responsive to the submitted search query.

The result of the search, the plurality of geographical entities, is reflected on display 200 as illustrated in FIG. 2. In graphical map display area 210, a map is displayed, including markers 225 corresponding to locations of the geographical entities on the displayed map. In search listing display area 215, the plurality of geographical entities are listed, with corresponding information. FIG. 2 illustrates an example in which five geographical entities, labeled A to E, are shown as responsive to the text-based search illustrated in search text entry element 205. Due to limited display area, only listings for geographical entities A and B are visible. Scrollbar 230 allows a user to scroll the items visible in search listing display area 215, to allow review of each of the geographical entities identified as responsive to the submitted search. Limited display area may also prevent all of the locations of the geographical entities to be simultaneously displayed in graphical map display area 210. However, user device 105 is configured to allow for panning and zooming in and out of graphical map display area 210 to facilitate reviewing the map displayed in graphical map display area 210 and markers 225 positioned thereon.

Search listing display area 215 includes two geographical entity listings 220a and 220b, respectively corresponding to the geographical entities labeled A and B (although there are other geographical entity listings not visible in FIG. 2, due to limited display area for search listing display area 215). Geographical entity listing 220a includes a summary 235a, displaying information about corresponding geographical entity A. Information displayed in summary 235a may include, but is not limited to, a name for the geographical entity, a street address, a telephone number, a rating element for displaying an aggregate rating of a geographical entity or a rating previously submitted by a particular user of user device 105, and display elements that allow for obtaining and displaying more detailed information about a geographical entity via user device 105.

Geographical entity listing 220a further displays user-submitted comments 240a and 240b. User-submitted comment 240a includes a text-based comment (although in some aspects of the disclosed subject matter, a comment may comprise images, hyperlinks, and other information viewable and useable via user device 105). In some aspects of the disclosed subject matter, as illustrated in FIG. 2, user-submitted comment 240a may be displayed with an avatar (an image for, and typically selected by, the user that submitted the comment), an account name or other identifier for the user (e.g., "yaxdrew" for comment 240a), and a time at which the comment was submitted (displayed, for example, as a relative or absolute time). Other features which might be provided for the display of user-submitted comment 240a, but are not illustrated in FIG. 2, include, but are not limited to, an element which allows one to review other comments submitted by the same user, an element which allows submitting a text message or other private message to the user that submitted the comment, and an element for indicating a like or dislike of a particular comment or the user that posted the comment.

Typically, the most recent user-submitted comments are displayed in geographical element listing 220a, in order to facilitate communication among users of map service 110 about geographical entities. Due to limited display area on user device 105, often only a portion of the user-submitted comments available for a geographical entity may be simultaneously displayed. To allow other user-submitted comments to be reviewed, in some aspects of the disclosed subject matter a scrollbar similar to scrollbar 230 may be provided, a user interface element which presents a window for reviewing more user-submitted comments may be provided, or a user interface element which allows for searching through user-submitted comments may be provided, by way of example. Additionally, user interface elements such as pulldown or popup windows may be used for reviewing and submitting user-submitted comments. Such windows may appear in response to detected user interface operations such as a mouse "hover" or a sustained "long click" of a displayed geographical entity. In some aspects of the disclosed subject matter, initially a summary, without user-submitted comments, is displayed for each geographical entity in search listing display area 215, with a more detailed listing item, such as geographical element listing 220 as illustrated in FIG. 2, presented for a geographical entity in response to its selection, either via its listing or its corresponding marker 225 in graphical map display area 210. In some aspects of the disclosed subject matter, a user may register preferences for how such user interface elements are used.

Geographical entity listing 220a further displays a comment entry element 245a. User device 105 is configured to permit text entry of a comment via comment entry element 245a. The entered comment is submitted to map service 110 in response to a selection of comment submission button 246a. Once submitted, the user-submitted comment may be provided for other users to review, and additionally may be used Although elements for reviewing and submitting user-submitted comments are illustrated in FIG. 2 with respect to a listing of geographical entities in response to a search query, those skilled in the art would understand that such elements can be incorporated into other presentations of information for geographical entities. For example, in response to a user selecting a specific marker 225, graphical map display area 210 may display a window (not illustrated in FIG. 2) which displays information and elements similar to those illustrated in geographical element listing 220a. As another example, user device 105 may be configured to obtain and display detailed information about a geographical entity, which may include user-submitted comments for the geographical entity.

Display 200 further includes login element 250, by which a user can sign in or log in to an account associated with map service 110. Many other mechanisms are well known in the art for allowing a user to, either expressly and/or automatically, log in to such an account. When logged in to the account, a new comment submitted via user device 105 will be associated with the account. For example, FIG. 2 illustrates user-submitted comments 240a, 240b, and 240c which were either submitted under known user accounts. However, a user is not required to log in to an account to submit comments. For example, user-submitted comment 240d, indicated as having been submitted by "guest," is not associated with any account. By not requiring users to sign in to map service 110, the barrier for participation is reduced, resulting in increased submission of user-submitted comments. However, where ranking is applied to user-submitted comments, the account associated with a comment may be taken into account, as well as whether a comment was anonymously submitted (i.e., no account is associated with the comment). For example, a comment may have a reduced effect for ranking geographical entities if the user is not signed into an account provided by the system when submitting the comment (e.g., the comment was anonymously submitted).

In some aspects of the disclosed subject matter, if a user is logged in to an account, other accounts may be associated with the account (e.g., in the form of a social network), and the displayed user-submitted comments may be limited to comments contributed by these other accounts. Under the assumption that these networked accounts offer more valuable and/or relevant comments for the user, this may be preferred by some users over viewing user-submitted comments from any users. In some aspects of the disclosed subject matter, the display of comments from the other associated accounts may be prioritized over comments submitted by non-associated users or accounts.

Figure 3:
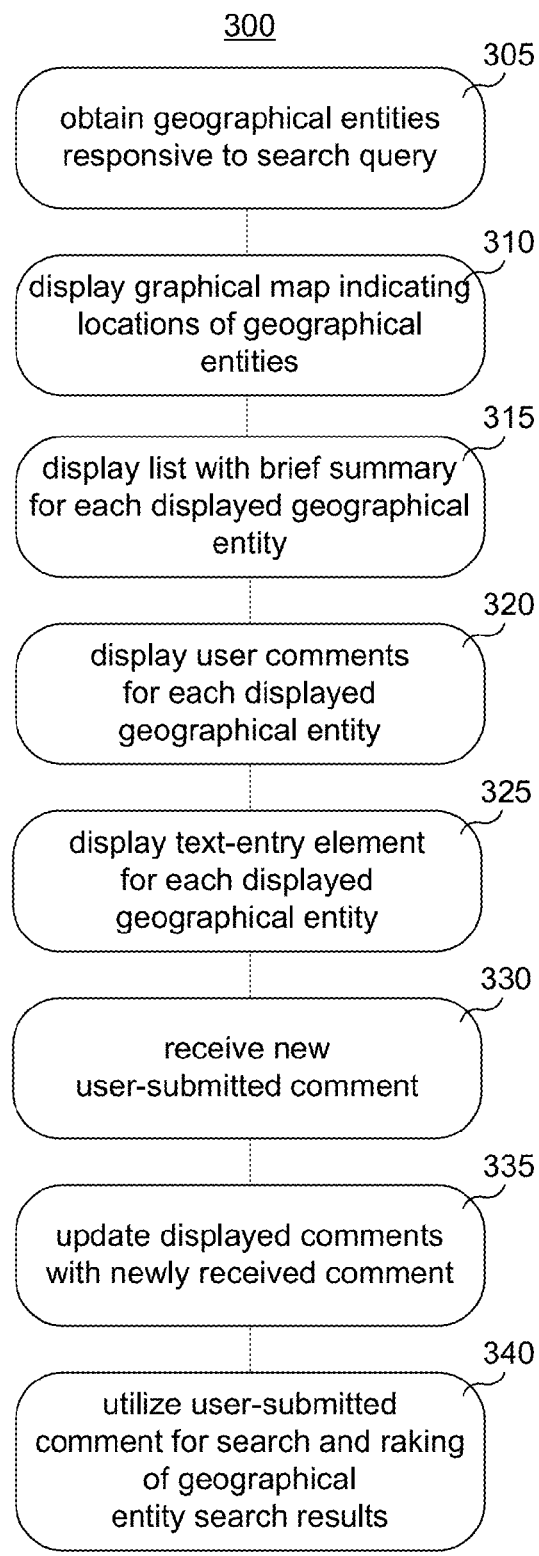
FIG. 3 illustrates a process 300 by which user-submitted comments are displayed and collected points of interest are identified.

FIG. 3 illustrates a process 300 by which user-submitted comments are displayed and collected points of interest are identified. In step 305, a plurality of geographical entities are obtained which are responsive to a search query submitted by user device 105. This search is performed with respect to items stored in the previously mentioned geographical entity database maintained by map service 110, and may also take into account, via indexing or ranking procedures used to accomplish the search, user-submitted comments stored in comment storage 115.

In step 310, a graphical map display area with indicates the locations of the geographic entities on a map is displayed. Graphical map display area 210 in FIG. 2 illustrates an example of the map display. In step 315, a listing of the geographical entities obtained in step 305, with a brief summary relating to each, is displayed via user device 105. Search listing display area 215 in FIG. 2 illustrates an example of the listing. Summary 235a in FIG. 2 illustrates an example of the brief summary. In step 320, for each displayed geographical entity, user-submitted comments are obtained from comment storage 115 and displayed via user device 105, as illustrated by user-submitted comments 240a and 240b in FIG. 2. In step 325, for each displayed geographical entity, a text-entry element is displayed which allows, via user device 105, for a user to submit a new user-submitted comment for a particular geographical entity.

In step 330, map service 110 receives a new user-submitted comment from user device 105. In most cases, the new comment is stored in comment storage 115, although in some cases a comment may fail to pass filtering for abusive language or other inappropriate content, resulting in the new comment being rejected or otherwise not retained in comment storage 115 for later use. As discussed previously, user-submitted comments may include media other than simple text, with the capabilities of the element provided for entering and submitting new user-submitted comments corresponding to the available media options.

In some aspects of the disclosed subject matter, step 335 may be performed, in which user device 105 may perform live updating of geographical element listing 220a, such that a new user-submitted comment (including one submitted by user device 105) for the geographical element corresponding to geographical element listing 220a submitted while geographical element listing 220a is being displayed are added to geographical element listing 220a. In some aspects of the disclosed subject matter, this may be accomplished via a "push" transaction, in which map service 110 pushes updated data to user device 105, which causes geographical element listing 220a to be updated with a new user-submitted comment. In such aspects, this live updating of the display with new comments may allow users to conduct a real-time discussion about a particular geographical entity.

In step 340, the new user-submitted comment may be utilized for search and ranking of results in future searches for geographical entities. In some aspects of the disclosed subject matter, this may be performed by examining the content of user-submitted comments for generating a search index for geographical entities. Additionally, the content of user-submitted contents may be used for ranking an initial set of results, to better identify more significant or relevant geographical entities.

User-submitted comments stored in comment storage 115, or other user-generated data obtained via the disclosed systems and techniques, may be considered private by users, such as a user of user device 105. In an aspect of the disclosed subject matter, such records or information may be anonymized and not connected with actual user identities. Additionally, as discussed above, users may submit user-submitted comments without logging on. Likewise, if currently logged in, a user may log out prior to submitting a new comment. Additionally, users submit comments by choice, and accordingly may choose not to submit comments. In an aspect of the disclosed subject matter, users may opt out of the collection of such data. In an aspect of the disclosed subject matter, users may review collected data and remove or modify particular data. In an aspect of the disclosed subject matter, security procedures, such as limiting access to stored information to specified accounts, may be used to restrict access to such information to authorized users or systems.

In the above description, although user device 105 may be described as displaying particular items of information, the terms "display" or "displaying" may also be applied to map service 110 providing information to user device 105 for display to a user. Accordingly, for example, map service 110 may display user comments by selecting and providing particular user comments to user device 105 for display.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software inventions can be implemented as sub-parts of a larger program while remaining distinct software inventions. In some implementations, multiple software inventions can also be implemented as separate programs. Finally, any combination of separate programs that together implement a software invention described here is within the scope of the invention. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 4:
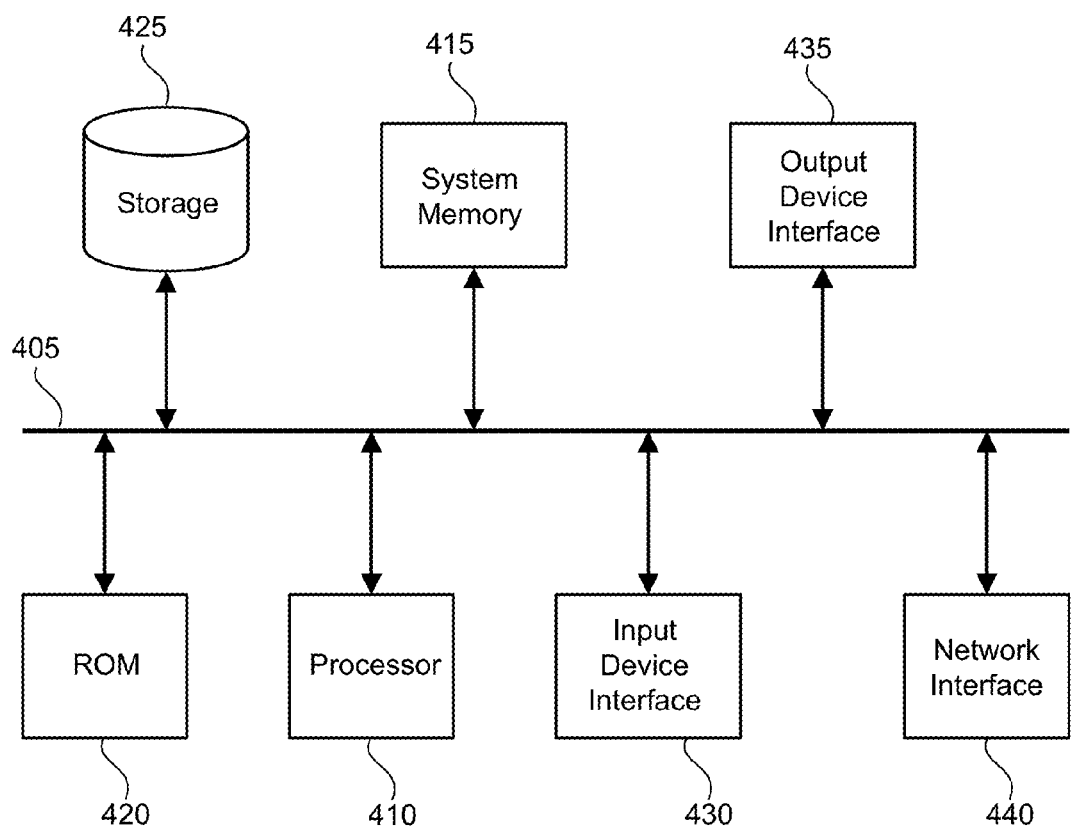
FIG. 4 conceptually illustrates an electronic system 400 with which some implementations of the subject technology are implemented.

FIG. 4 conceptually illustrates an electronic system 400 with which some implementations of the subject technology are implemented. The electronic system 400 can be a computer, phone, PDA, or any other sort of electronic device. Such an electronic system includes various types of computer readable media and interfaces for various other types of computer readable media. Electronic system 400 includes a bus 405, processing unit(s) 410, a system memory 415, a read-only memory 420, a permanent storage device 425, an input device interface 430, an output device interface 435, and a network interface 440.

The bus 405 collectively represents all system, peripheral, and chipset buses that communicatively connect the numerous internal devices of the electronic system 400. For instance, the bus 405 communicatively connects the processing unit(s) 410 with the read-only 420, the system memory 415, and the permanent storage device 425.

From these various memory units, the processing unit(s) 410 retrieves instructions to execute and data to process in order to execute the processes of the invention. The processing unit(s) can be a single processor or a multi-core processor in different implementations.

The read-only-memory (ROM) 420 stores static data and instructions that are needed by the processing unit(s) 410 and other modules of the electronic system. The permanent storage device 325, on the other hand, is a read-and-write memory device. This device is a non-volatile memory unit that stores instructions and data even when the electronic system 400 is off. Some implementations of the invention use a mass-storage device (such as a magnetic or optical disk and its corresponding disk drive) as the permanent storage device 425.

Other implementations use a removable storage device (such as a floppy disk, flash drive, and its corresponding disk drive) as the permanent storage device 425. Like the permanent storage device 425, the system memory 415 is a read-and-write memory device. However, unlike storage device 425, the system memory 415 is a volatile read-and-write memory, such a random access memory. The system memory 415 stores some of the instructions and data that the processor needs at runtime. In some implementations, the invention's processes are stored in the system memory 415, the permanent storage device 425, and/or the read-only memory 420. For example, the various memory units include instructions for processing multimedia items in accordance with some implementations. From these various memory units, the processing unit(s) 410 retrieves instructions to execute and data to process in order to execute the processes of some implementations.

The bus 405 also connects to the input and output device interfaces 430 and 435. The input device interface 430 enables the user to communicate information and select commands to the electronic system. Input devices used with input device interface 430 include, for example, alphanumeric keyboards and pointing devices (also called "cursor control devices"). Output device interfaces 435 enables, for example, the display of images generated by the electronic system 400. Output devices used with output device interface 435 include, for example, printers and display devices, such as cathode ray tubes (CRT) or liquid crystal displays (LCD). Some implementations include devices such as a touchscreen that functions as both input and output devices.

Finally, as shown in FIG. 4, bus 405 also couples electronic system 300 to a network (not shown) through a network interface 440. In this manner, the computer can be a part of a network of computers (such as a local area network ("LAN"), a wide area network ("WAN"), or an Intranet, or a network of networks, such as the Internet. Any or all components of electronic system 300 can be used in conjunction with the invention.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A machine-implemented method for displaying user-submitted comments for geographic entities, the method comprising:
   receiving a search query for geographic entities;
   displaying, in response to the received search query, a list of geographic entities; and
   displaying, concurrently for each listed geographic entity, content of one or more user-submitted comments associated with the geographic entity, and a comment entry field which permits a user to submit a new comment associated with the geographic entity, wherein each of the one or more user-submitted comments corresponds to a comment submitted by an individual user, and wherein, for each of the user submitted-comments, display of the content of the user-submitted comment is prioritized based on whether the user-submitted comment was submitted by a contact of the user within a social network.

2. The method of claim 1, further comprising:

displaying a graphical map display area which indicates the locations of the geographic entities on a map, concurrent with the list of geographic entities, and the content of one or more user-submitted comments and the comment entry field for each listed geographic entity.

3. The method of claim 1, further comprising:

receiving a second new comment; and updating, while displaying the content of the user-submitted comments, the displayed content of the user-submitted comments to include content of the second new comment.

4. The method of claim 1, further comprising:

receiving the new comment associated with one of the plurality of geographic entities; and utilizing the new comment for generating a search index of geographical entities.

5. The method of claim 1, further comprising:

receiving, via the comment entry field, the new comment associated with one of the listed geographic entities; and utilizing the new comment to rank the listed geographical entities, based on whether the new comment was anonymously submitted.

6. The method of claim 1, further comprising:

displaying, for each of the user-submitted comments, a graphical component for sending a text message or a private message to the respective individual user who submitted the comment.

7. A system for displaying user-submitted comments for geographic entities, the system comprising:

one or more processors; and a computer readable storage medium comprising instructions stored therein, which when executed by the processors, cause the processors to perform operations comprising:

receiving a search query for geographic entities;

displaying, in response to the received search query, a list of geographic entities;

displaying, concurrently for each listed geographic entity, content of one or more user-submitted comments associated with the geographic entity, and a comment entry field which permits a user to submit a new comment associated with the geographic entity, wherein each of the one or more user-submitted comments corresponds to a comment submitted by an individual user, and wherein, for each of the user-submitted-comments, display of the content of the user-submitted comment is prioritized based on whether the user-submitted comment was submitted by a contact of the user within a social network;

receiving a second new comment; and updating, while displaying the content of the user-submitted comments, the displayed content of the user-submitted comments to include the second new comment.

8. The system of claim 7, the operations further comprising:

displaying a graphical map display area which indicates the locations of the geographic entities on a map, concurrent with the list of geographic entities, and the content of one or more user-submitted comments and the comment entry field for each listed geographic entity.

9. The system of claim 7, the operations further comprising:

receiving the new comment associated with one of the plurality of geographic entities; and utilizing the new comment for generating a search index of geographical entities.

10. The system of claim 7, the operations further comprising:

receiving the new comment associated with one of the plurality of geographic entities; and utilizing the new comment for ranking geographical entities.

11. The system of claim 7, the operations further comprising:

displaying, for each of the user-submitted comments, a graphical component for sending a text message or a private message to the respective individual user who submitted the comment.

12. A computer readable storage medium comprising instructions stored therein, which when executed by a machine, cause the machine to perform operations comprising:

receiving a search query for geographic entities;

displaying, in response to the received search query, a list of geographic entities;

displaying, concurrently for each listed geographic entity, content of one or more user-submitted comments associated with the geographic entity and a comment entry field which permits a user to submit a new comment associated with the geographic entity, wherein each of the one or more user-submitted comments corresponds to a comment submitted by an individual user, and wherein, for each of the user submitted-comments, display of the content of the user-submitted comment is prioritized based on whether the user-submitted comment was submitted by a contact of the user within a social network;

receiving the new comment associated with one of the plurality of geographic entities; and utilizing the new comment for ranking geographical entities.

13. The medium of claim 12, the operations further comprising:

displaying a graphical map display area which indicates the locations of the geographic entities on a map, concurrent with the list of geographic entities, and the content of one or more user-submitted comments and the comment entry field for each listed geographic entity.

14. The medium of claim 12, the operations further comprising;

receiving a second new comment; and updating, while displaying the content of the user-submitted comments, the displayed content of the user-submitted comments to include content of the second new comment.

15. The medium of claim 12, the operations further comprising:

receiving the new comment associated with one of the plurality of geographic entities; and utilizing the new comment for generating a search index of geographical entities.

16. The medium of claim 12, the operations further comprising:
 displaying, for each of the user-submitted comments, a graphical component for sending a text message or a private message to the respective individual user who submitted the comment.

17. The medium of claim 12, wherein
 the new comment has a reduced effect for ranking geographical entities if the user is not signed into an account provided by the system when submitting the new comment.

* * * * *